United States Patent
Sponza et al.

(10) Patent No.: US 10,009,715 B2
(45) Date of Patent: Jun. 26, 2018

(54) GEOGRAPHIC INFORMATION FOR WIRELESS NETWORKS

(71) Applicant: Microsoft Technology Licensing, LLC, Redmond, WA (US)

(72) Inventors: Mateja Sponza, Tallinn (EE); Shadi Mahassel, London (GB); Imelda J. Kirby, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 14/590,515

(22) Filed: Jan. 6, 2015

(65) Prior Publication Data

US 2016/0198292 A1  Jul. 7, 2016

(51) Int. Cl.
*H04W 4/02* (2018.01)
*H04W 48/18* (2009.01)
(Continued)

(52) U.S. Cl.
CPC .......... *H04W 4/02* (2013.01); *H04W 8/005* (2013.01); *H04W 48/16* (2013.01); *H04W 48/18* (2013.01); *H04W 52/0254* (2013.01); *H04M 1/72572* (2013.01); *H04W 64/00* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/26* (2018.01)

(58) Field of Classification Search
CPC ........ H04W 4/02; H04W 48/04; H04W 48/18

USPC ........................................... 455/456.1, 456.6
See application file for complete search history.

(56) References Cited

U.S. PATENT DOCUMENTS

| | | | |
|---|---|---|---|
| 5,950,130 A | * | 9/1999 | Coursey ................ H04W 48/16 455/419 |
| 7,894,809 B2 | | 2/2011 | Munje |

(Continued)

FOREIGN PATENT DOCUMENTS

| | | |
|---|---|---|
| WO | WO-02093955 | 11/2002 |
| WO | WO-2006100653 | 9/2006 |
| WO | WO-2013177436 | 11/2013 |

OTHER PUBLICATIONS

"Windows 8 Release Preview", Available at: <http://www.microsoft.com/about/mspreview/windows8/Windows8_RP_Product_guide.pdf >, Jun. 11, 2012, 37 pages.

(Continued)

*Primary Examiner* — Vladimir Magloire
*Assistant Examiner* — Don Braswell

(57) ABSTRACT

Techniques for geographic information for wireless networks are described. According to various embodiments, a connectivity module on a mobile device receives geographic position information for a mobile device from another functionality of the mobile device and independent of a query by the connectivity module for the information. The connectivity module retrieves the geographic position information locally on the device, and utilizes the geographic position information to cause various actions to be performed. For instance, the connectivity module utilizes the geographic position information to identify a wireless network at a particular geographic region, and to cause a wireless scan to be initiated to detect the wireless network.

20 Claims, 8 Drawing Sheets

(51) Int. Cl.
*H04W 48/16* (2009.01)
*H04W 8/00* (2009.01)
*H04W 52/02* (2009.01)
H04W 64/00 (2009.01)
H04M 1/725 (2006.01)

(56) References Cited

U.S. PATENT DOCUMENTS

| | | |
|---|---|---|
| 8,238,980 B1 | 8/2012 | Shusterman |
| 8,509,860 B2 | 8/2013 | Heshmati |
| 8,699,991 B2 | 4/2014 | Fasold |
| 2005/0181734 A1* | 8/2005 | Coutts .................. H04W 48/18 455/67.16 |
| 2013/0023290 A1* | 1/2013 | Rofougaran .......... G01S 13/426 455/456.3 |
| 2013/0084892 A1* | 4/2013 | Teyeb .................. H04W 4/023 455/456.6 |
| 2013/0244686 A1 | 9/2013 | Saha et al. |
| 2014/0045481 A1 | 2/2014 | Fraley |
| 2014/0079043 A1 | 3/2014 | Montemurro et al. |
| 2014/0105084 A1 | 4/2014 | Chhabra et al. |
| 2014/0171097 A1* | 6/2014 | Fischer .................. H04W 4/02 455/456.1 |
| 2014/0171112 A1 | 6/2014 | Zhu et al. |

OTHER PUBLICATIONS

"International Search Report and Written Opinion", Application No. PCT/US2016/012097, dated Mar. 21, 2016, 16 pages.
"International Preliminary Report on Patentability", Application No. PCT/US2016/012097, dated Mar. 16, 2017, 10 pages.
"Second Written Opinion", Application No. PCT/US2016/012097, dated Nov. 28, 2016, 7 pages.

\* cited by examiner

| Network ID 202 | Authentication Information 204 | Authentication Protocol 206 | Geographic Range 208 | Network Preference 210 | [ . . . ] |
|---|---|---|---|---|---|
| Network ABC | NetworkABCKey | ABC_Protocol | ABC_Geographic Coordinates | Preferred Network | |
| Network 123 | null | Open | 123_Geographic Coordinates | Non-Preferred Network | |
| Network XYZ | NetworkXYZKey | XYZ_Protocol | XYZ_Geographic Coordinates | Preferred Network | |
| 212 | | [ · · · ] | | | |

*Fig. 2*

GEOGRAPHIC INFORMATION FOR WIRELESS NETWORKS

BACKGROUND

Today's mobile devices provide users with a tremendous amount of portable functionality. For instance, smartphones, tablets, laptops, and so on, enable users to perform a variety of different tasks without being tied to a particular location. Since a user may move between locations, it can be useful to know where a user is located at a particular time, such as for providing location-specific content and services.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for geographic information for wireless networks are described. According to various embodiments, a connectivity module on a mobile device receives geographic position information for a mobile device from another functionality of the mobile device and independent of a query by the connectivity module for the information. The connectivity module retrieves the geographic position information locally on the device, and utilizes the geographic position information to cause various actions to be performed. For instance, the connectivity module utilizes the geographic position information to identify a wireless network at a particular geographic region, and to cause a wireless scan to be initiated to detect the wireless network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 illustrates an example network table in accordance with one or more implementations.

DETAILED DESCRIPTION

Overview

Figure 1:
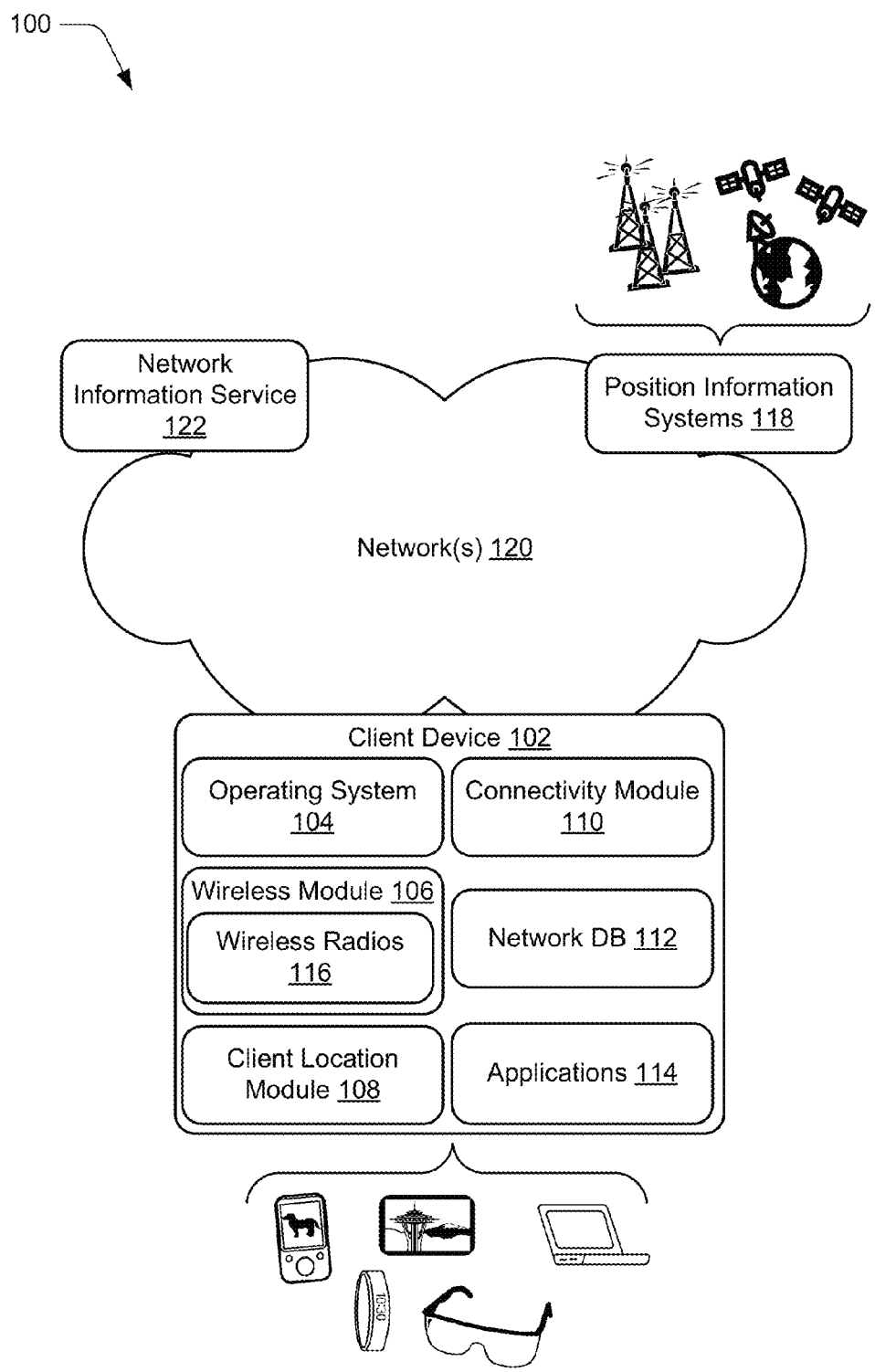
FIG. 1 is an illustration of an environment in an example implementation that is operable to employ techniques discussed herein in accordance with one or more implementations.

Techniques for geographic information for wireless networks are described. According to various implementations, a connectivity module on a mobile device registers to receive a notification when geographical position information is available on the mobile device. For instance, the connectivity module registers to receive a wake event to wake the connectivity module from an inactive state when the geographic position information is available. Generally, the connectivity module represents a functionality that manages various wireless connectivity tasks for a mobile device.

According to one or more implementations, a connectivity module receives geographic position information for a mobile device independent of a query for the information. For instance, when another functionality of the mobile device (e.g., an application and/or service) retrieves geographic position information, the connectivity module is notified that the information is available locally on the device. According to various implementations, the geographic position information corresponds to an estimated current location of the mobile device, and/or a projected future location estimated based on trajectory and velocity information for the mobile device. The connectivity module retrieves the geographic position information locally on the device, and utilizes the geographic position information to cause various actions to be performed.

For instance, the connectivity module utilizes the geographic position information to identify and select a wireless network that is available at a location that corresponds to the geographic position information. The connectivity module causes a network scan to be performed to identify wireless signal from the wireless network. For instance, the connectivity module schedules a network scan to be performed to detect the wireless network. Alternatively or additionally, the connectivity module instructs a wireless functionality of a mobile device to activate its wireless radio and scan for the wireless network.

According to various implementations, a connectivity module of a mobile device is maintained in an inactive state until a wake event is received in response to geographic position information being available locally on the mobile device. Further, a wireless functionality of a mobile device (e.g., a wireless radio) is maintained in an inactive state (e.g., off) until the connectivity module identifies an available wireless network at a particular location, and causes the wireless functionality to activate and scan for the wireless network. Thus, various resources of a mobile device are conserved, such as battery life, processing resources, wireless communication resources, and so forth.

For instance, instead of causing a wireless radio to perform open scanning in an attempt to identify an available wireless network, the wireless radio is kept in an inactive state until geographical position information is received and correlated to a known available wireless network at a particular location. At such point, the wireless radio is activated to search for the known available wireless network. Various other details of the techniques discussed herein are provided below.

According to various implementations, preparation for connectivity to a wireless network can occur ahead of time, such as prior to the wireless network being detected and/or prior to the wireless network being in-range. For instance, a network profile is loaded for a wireless network that is identified based on geographic position information and prior to the wireless network being detected. Generally, the network profile includes connectivity information such as a network identifier for the wireless network, authentication information for the wireless network, and so forth. Accordingly, the connectivity information is made available such that when the wireless network is detected (e.g., based on a wireless radio scan), the connectivity information is readily available. Thus, connection time and system resource usage are reduced for the connection process.

In the following discussion, an example environment is first described that is operable to employ techniques described herein. Next, a section entitled "Example Procedures" describes some example procedures for geographic information for wireless networks in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for geographic information for wireless networks in accordance with one or more implementations. Environment 100 includes a client device 102 which can be embodied as any suitable device such as, by way of example and not limitation, a smartphone, a wearable device, a tablet computer, a portable computer (e.g., a laptop), a desktop computer, and so forth. One of a variety of different examples of the client device 102 is shown and described below in FIG. 9.

The client device 102 includes an operating system 104, a wireless module 106, a client location module 108, a connectivity module 110, a network database (DB) 112, and applications 114. Generally, the operating system 104 is representative of functionality to manage resources of the client device 102 and may be implemented using any suitable instruction format. According to various implementations, the operating system 104 abstracts various resources of the client device 102 to enable various entities to access and interact with the resources.

The wireless module 106 is representative of functionality to enable the client device 102 to communicate wirelessly with other devices and/or entities. The wireless module 106 can be configured to enable data communication via a variety of different wireless techniques and protocols. Examples of such techniques and/or protocols include cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16), wireless telephone networks, and so on.

The wireless module 106, for instance, includes hardware and logic components that can be employed to enable the client device 102 to communicate wirelessly. Examples of such wireless hardware components include radio transmitters, radio receivers, various types and/or combinations of antennas, and so on. In at least some embodiments, the client device 102 is a multi-radio device that can communicate via different wireless technologies and/or protocols. For example, the wireless module 106 includes wireless radios 116 which are representative of hardware for transmitting and receiving wireless signals according to different wireless technologies and protocols.

The client location module 108 is representative of functionality to enable the client device 102 to ascertain its location based on location information received from other devices. The client location module 108, for instance, can receive location information from position information systems 118, and can process the location information in various ways to estimate a location of the client device 102. Examples of position information include GPS coordinates, street addresses, network location, location with reference to a cell tower and/or set of cell towers, and so forth.

According to various implementations, the client device 102 communicates wireless via connectivity to one or more networks 120. Generally, the networks 120 are representative of a combination of different interconnected networks. In at least some implementations, the networks 120 include different portions of the radio spectrum that may be leveraged for wireless communication. The networks 120, for instance, may include a cellular network, a wireless broadband network (e.g., WiFi™), a satellite communication network, a short range wireless network (e.g., Bluetooth, near field communication (NFC), and so on), and so forth. The networks 120 may also represent a combination of wireless and wired networks and may be configured in a variety of ways, such as a wide area network (WAN), a local area network (LAN), the Internet, and so forth. Accordingly, communication between the client device 102 and other devices may be implemented via a variety of different technologies (wired and wireless), such as wireless broadband, Bluetooth, cellular, and so forth.

The connectivity module 110 is representative of functionality to manage various wireless connectivity tasks for the client device 102. As further detailed below, the connectivity module 110 can utilize position information detected by the client device 102 to perform different connectivity-related tasks. For instance, the connectivity module 110 performs various aspects of techniques for geographic information for wireless networks discussed herein.

According to various implementations, the network DB 112 is representative of functionality to retrieve and store network information about the different networks 120. The network DB 112, for instance, stores network identifiers for individual networks 120, such as service set identifiers (SSID) and other types of network identifiers.

The network DB 112 further correlates individual networks 120 with different location information, such as geographical locations at which the client device 102 may connect to the different networks 120. For example, the network DB 112 includes a connectivity range mapping that correlates individual networks 120 with particular geographical ranges in which a quality of wireless connectivity to the individual networks is acceptable, e.g., exceeds a threshold signal quality and/or signal strength.

The network DB 112 further stores authentication information for the different networks 120. Examples of such authentication information include network keys, network passwords, usernames for network accounts, authentication protocols utilized by individual networks, and so forth. Generally, the authentication information enables connectivity to the various networks 120.

The network DB 112 may store a variety of other information for the networks 120, such as network type, network service provider identifiers, historic network quality, and so forth.

The applications 114 are generally representative of functionalities to perform various tasks via the client device 102. As used herein, the term "applications" can refer to applications that are run locally and/or in a distributed environment, as well as services such as local services, web services, cloud-based services, and so forth. Examples of the applications 114 include a word processing application, a web browser, an email client, a communication service, a spreadsheet application, a content editing application, a web-based service portal, a geographic location service, and so forth.

According to one or more implementations, information for the network DB 112 may be retrieved from a network information service 122. Generally, the network information service 122 is representative of network-accessible resource for information for the networks 120 and may be implemented in various ways, such as a cloud service, a service implemented by a network service provider, a standalone service, and so forth.

For purposes of discussion herein, various entities may be referred to in both plural and singular implementations. Accordingly, a reference to singular implementation refers to an instance of the plural implementation.

FIG. 2 illustrates an example network table 200 in accordance with one or more implementations. The network table 200, for instance, is implemented as part of the network DB 112 to enable the connectivity module 110 to leverage network information to perform various connectivity-related tasks for the client device 102.

The network table 200 includes a network identifier (ID) column 202, an authentication information column 204, an authentication protocol column 206, a geographic range column 208, and a network preference column 210. These examples of different network information are presented for purpose of example only, and it is to be appreciated that various other types of network information may be tracked and leveraged in accordance with the implementations disclosed herein.

Generally, the different rows in the network table 200 represent network profiles for different wireless networks. For instance, a network profile 212 represents a network profile for a wireless Network ABC. Examples of information included in the different network profiles is now discussed.

The network ID column 202 includes identifiers for different wireless networks, such as for the networks 120. Various types of identifiers may be employed, such as network names, network SSIDs, internet protocol (IP) addresses, and so forth. Generally, the individual rows of the network table 200 correspond to network profiles for different networks identified in the network ID column 202.

The authentication information column 204 includes authentication information for different networks, such as network keys, passwords, user names, and so forth. The authentication protocols column 206 identifies authentication protocols utilized by different networks, and whether particular networks utilize authentication. For instance, some networks are open and thus may not utilize an authentication protocol.

The geographic range column 208 includes geographic information that identifies geographic regions for the different wireless networks. For instance, the range column 208 includes GPS coordinates and/or other geographic information that describes geographic regions in which connectivity to particular wireless networks is available. As an example, the "ABC Geographic Coordinates" for the Network ABC may define boundaries of a geographic region within which connectivity to the Network ABC is available and/or is within acceptable signal strength and/or signal quality.

The network preference column 210 identifies whether certain wireless networks are preferred over others. For instance, a particular geographic region may have multiple available wireless networks identified in the network table 200. In such as case, an available network identified in the preference column 210 as being preferred is given preference for network connectivity for a device (e.g., the client device 102) over another available network that is not preferred.

Network preference may be based on various factors, such as historic signal strength (e.g., a network with higher historic signal strength is preferred over a network with lower historic signal strength), historic signal quality (e.g., a network with higher historic signal quality is preferred over a network with lower historic signal quality), cost of connecting to the network (e.g., a network with lower connection cost (e.g., price/rate to connect) is preferred over a network with higher connection cost), whether a network is known to be secure (e.g., a more secure network is preferred over a less secure network), and so forth.

In at least some implementations, network information stored in the network table 200 is retrieved from the network information service 122. For instance, the client device 102 may query the network information service 122 for network information. Alternatively or additionally, the network information service 122 may push network information down to the client device, such as independent of a query by the client device 102 for the network information. Accordingly, in at least some implementations, the connectivity module 110 may purge old data (e.g., stale network information) from the network table 200, and may update the network table 200 with current network information received from the network information service 122.

Having described an example environment in which the techniques described herein may operate, consider now some example procedures in accordance with one or more implementations.

Example Procedures

This section describes some example procedures for performing different aspects of techniques for geographic information for wireless networks discussed herein. The procedures described herein may be used separately or in combination with each other, in whole or in part. These procedures are shown as sets of operations (or acts) performed, such as through one or more entities or modules, and are not necessarily limited to the order shown for performing the operation. The example procedures may be employed in the environment 100 of FIG. 1, the system 800 of FIG. 8, and/or any other suitable environment. In at least some implementations, steps described for the various procedures are implemented automatically and independent of user interaction.

Figure 3:
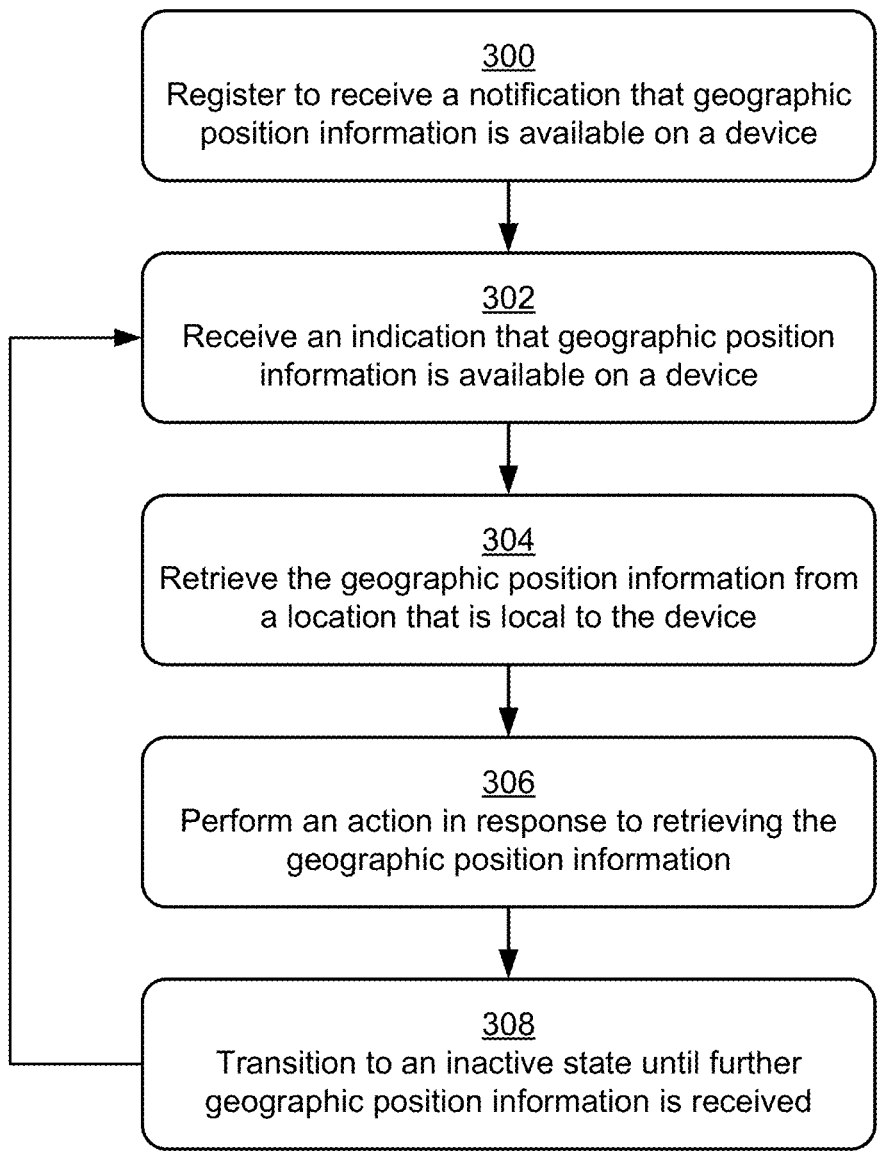
FIG. 3 is a flow diagram that describes steps in a method for causing an action to be performed based on geographic position information in accordance with one or more implementations.

FIG. 3 is a flow diagram that describes steps in a method for causing an action to be performed based on geographic position information in accordance with one or more implementations. In at least some implementations, the method is performed by the client device 102, such as by the connectivity module 110.

Step 300 registers to receive a notification that geographic position information is available on a device. For instance, the connectivity module 110 registers with a functionality of the client device 102 (e.g., the operating system 104) to receive notifications when geographical position information is locally available on the client device 102. In at least some implementations, the registering includes requesting that a wake event being communicated to the connectivity module 110 to wake the connectivity module 110 from an inactive state to an active state such that the connectivity module 110 can retrieve geographic position information and cause an action to be performed based on the geographic position information. Thus, the wake event may be configured as an indication that geographic position information is available locally on a device.

Step 302 receives an indication that geographic position information is available on a device. The connectivity module 110, for instance, receives a notification from a functionality of the client device 102 (e.g., the operating system 104) that geographic position information for the client device 102 is available. In at least some implementations, the notification takes the form of a wake event that wakes the connectivity module 110 from an inactive state and notifies the connectivity module that the geographic position information is available.

According to various implementations, geographic position information is retrieved on the client device 102 based on a request from a functionality other than the connectivity module 110. For instance, an application 114 may request location information to determine a geographic location of the client device 102, a direction of movement of the client device 102, a rate of movement of the client device 102, and so forth. In response to the request, the client location module 108 queries a position information system 118 for geographic position information for the client device, such as GPS coordinates, a geographic place name, a physical address, and so forth. The position information system 118 returns the geographic position information to the client device 102 such that the geographic position information is available locally to different functionalities of the client device 102, such as the connectivity module 110.

Accordingly, in at least some implementations, the connectivity module 110 does not initiate direct requests for geographic position information, but is configured to retrieve and utilize geographic position information that is retrieved and made locally available by other functionalities. For instance, the indication that the geographical position information is available is received by the connectivity module 110 independent of a query by the connectivity module 110 for geographical position information.

Step 304 retrieves the geographic position information from a location that is local to the device. For instance, the connectivity module 110 receives the geographic position information from another functionality of the client device 102, such as the client location module 108, the operating system 104, and so forth.

Step 306 performs an action in response to retrieving the geographic position information. Various actions are performable in relation to the selected wireless network, examples of which are detailed in the following procedures.

Step 308 transitions to an inactive state until further geographic position information is received. For instance, after performing and/or initiating various actions in response to retrieving the geographic position information, the connectivity module 110 transitions to an inactive state until a notification of further geographic position information is received. In an inactive state, the connectivity module 110 may be configured to receive wake events to become active, but may not proactively initiate other actions.

As illustrated, the procedure may return to step 302 when an indication of further geographical position information is received, such as a wake event communicated to the connectivity module 110.

Figure 4:
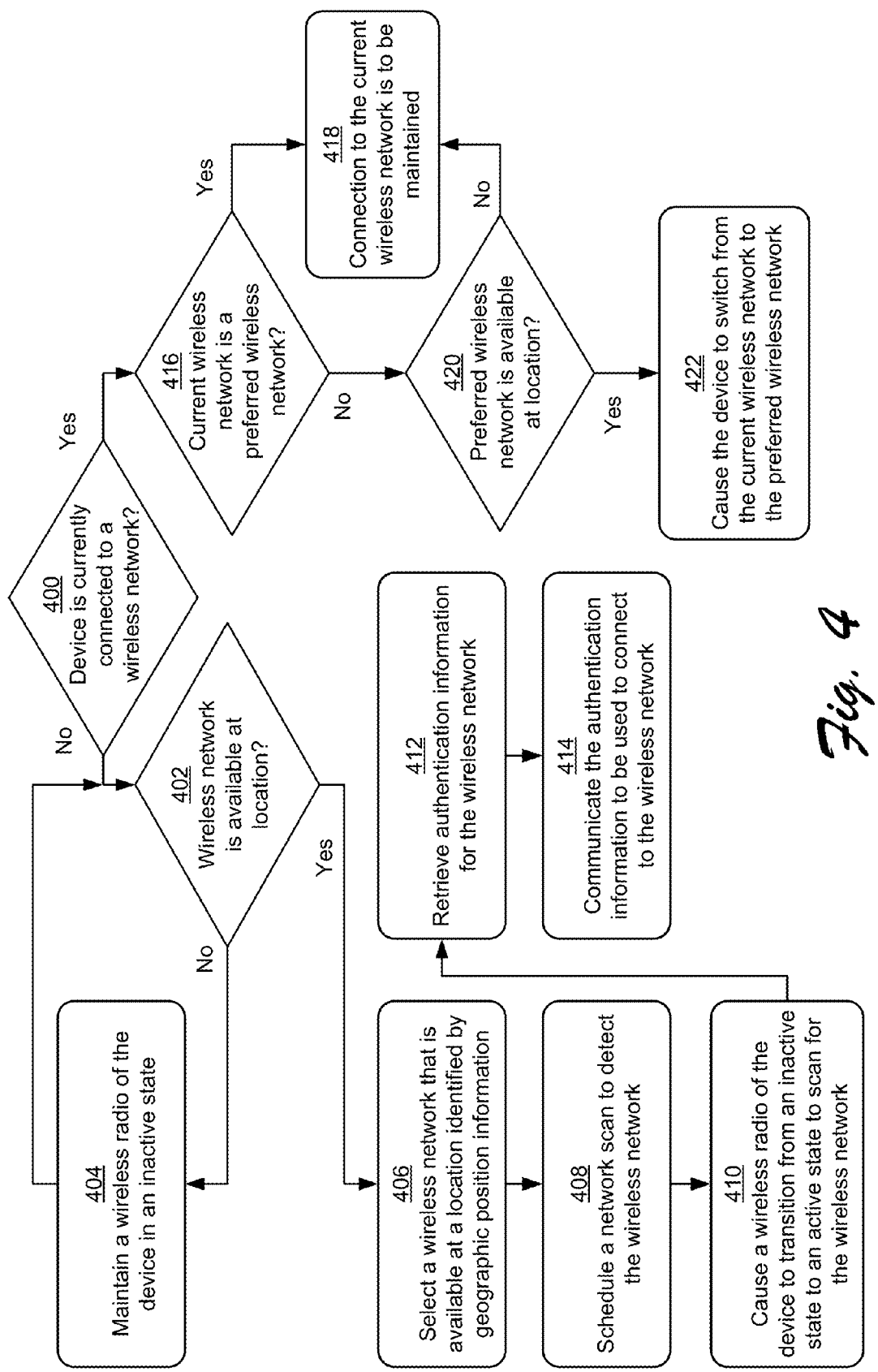
FIG. 4 is a flow diagram that describes steps in a method for performing an action based on geographic position information in accordance with one or more implementations.

FIG. 4 is a flow diagram that describes steps in a method for performing an action based on geographic position information in accordance with one or more implementations. The method, for instance, describes an example implementation of step 306 described above with reference to FIG. 3. In at least some implementations, the method is performed by the client device 102, such as by the connectivity module 110.

Step 400 ascertains whether a device is currently connected to a wireless network. The connectivity module 110, for example, queries the wireless module 106 and/or the operating system 104 to ascertain whether the client device 102 is currently connected to a wireless network.

If the device is not currently connected to a wireless network ("No"), step 402 ascertains whether a wireless network is available at a location identified by geographic position information. For instance, the geographic position information represents position information that is retrieved as described above with reference to FIG. 3. The connectivity module 110, for example, searches the network DB 112 with the geographic position information to ascertain whether a wireless network is available at a location (e.g., a geographic location) identified by the geographic position information.

Alternatively or additionally, the connectivity module 110 queries the network information service 122 with the geographic position information. For instance, the connectivity module 110 communicates the geographic position information to the network information service 122, which returns information indicating whether a wireless network is available and if so, information about the available wireless network(s). The connectivity module 110 stores the information about the available wireless network as part of the network DB 112. Thus, in at least some implementations, the client device 102 need not maintain comprehensive wireless network information locally, and may leverage the network information service 122 to provide such information.

If a wireless network is not available at the location ("No"), step 404 maintains a wireless radio of the device in an inactive state. For instance, one or more of the wireless radios 116 of the client device 102 are maintained in an inactive (e.g., off) state. According to one or more implementations, the procedure may return to step 402 as new geographic position information is received to ascertain whether a wireless network is available. For instance, as the client device 102 is moving (e.g., with a user that is traveling), new geographic position information is received indicating different locations of the client device 102.

If a wireless network is available at the location ("Yes"), step 406 selects a wireless network that is available at the location identified by geographic position information. The connectivity module 110, for example, searches the network DB 112 with the geographic position information to identify a wireless network that is available at a location (e.g., a geographic location) identified by the geographic position information. Alternatively or additionally, the connectivity module 110 queries the network information service 122 with the geographical position information, and the network information service 122 returns information identifying one or more available wireless networks, and attributes of the wireless networks.

In at least some implementations, a network profile for the selected wireless network is loaded to enable connection to the wireless network. For instance, the connectivity module 110 retrieves a network profile from the network DB 112, and provides information from the network profile to a functionality such as the wireless module 106 and/or the operating system 104. As referenced above, the network profile includes various information about the selected network, such as a network ID, authentication information for connecting to the wireless network, and so forth. Thus, an entity involved in negotiating a connection to the wireless network utilizes information from the network profile to establish a connection to the wireless network.

According to various implementations, the network profile for the selected network is loaded by the connectivity module 110 prior to the network being detected and/or prior to the client device 102 being in connectivity range of the network. Thus, preparation for upcoming connectivity to a wireless network can occur to expedite the connectivity process.

Step 408 schedules a network scan to detect the wireless network. The connectivity module 110, for example, notifies the wireless module 106 to initiate a network scan (e.g., via one or more of wireless radios 116) to detect the selected wireless network. In at least some implementations, the notification instructs the wireless module 106 to initiate the network scan immediately, or at a future time.

For instance, consider a scenario where the client device 102 is in motion, such as with a user that is traveling. Accordingly, the connectivity module 110 ascertains based on the geographic position information that the client device 102 is not currently in range of the wireless network. However, based on a current trajectory and speed of the user, the connectivity module 110 estimates that the client device 102 will likely be in range within a specific period of time. Accordingly, the connectivity module 110 schedules the network scan to be initiated after the specific period of time elapses and/or within a particular time interval. Battery power is thus conserved by delaying the network scan until the client device 102 is in range of a known wireless network. Accordingly, in at least some implementations, scheduling the network scan occurs while the network is not currently detected by the device, such as while a wireless radio of the device is in an inactive state.

Step 410 causes a wireless radio of the device to transition from an inactive state to an active state to scan for the wireless network. In at least some implementations, causing the wireless radio to transition from the inactive state to the active state is a result of the scheduled network scan.

Step 412 retrieves authentication information for the wireless network. Examples of authentication information are detailed above, and generally include one or more authentication factors that may be used to authenticate the client device 102 for access to a particular wireless network. The authentication information, for instance, is retrieved from the network table 200 and/or the network information service 122.

Step 414 communicates the authentication information to be used to connect to the wireless network. For instance, the connectivity module 110 communicates the authentication information to the wireless module 106. The wireless module 106 then communicates the authentication information to the selected wireless network to authenticate and establish wireless connectivity with the selected wireless network. For instance, the wireless module performs a network association procedure to associate with the wireless network such that the client device 102 transmits and receives data wirelessly via the wireless network.

Returning to step 400, if the device is currently connected to a wireless network ("Yes"), step 416 ascertains whether the current wireless network is a preferred wireless network. The connectivity module 110, for instance, compares a network ID for the current wireless network to the network DB 112 to ascertain whether the current wireless network is identified as a preferred wireless network. If the current wireless network is a preferred wireless network ("Yes"), step 418 ascertains that the connection to the current wireless network is to be maintained.

If the current wireless network is not a preferred wireless network ("No"), step 420 ascertains whether a preferred wireless network is available at a location identified by the geographic position information. The connectivity module 110, for instance, searches the network DB 112 and/or queries the network information service 122 with the geographic position information to ascertain whether a preferred wireless network is available at the location. If a preferred wireless network is not available at the location ("No"), the method returns to step 418.

If a preferred wireless network is available at the location ("Yes"), step 422 causes the device to switch from the current wireless network to the preferred wireless network. For instance, the connectivity module 110 instructs the wireless module 106 to disconnect from the current wireless network and to connect with the preferred wireless network. In at least some implementations, the connectivity module 110 retrieves authentication information for the preferred wireless network from the network DB 112 and/or the network information service 122, and communicates the authentication information to the wireless module 106 to be used to connect to the preferred wireless network. Thus, the wireless module 106 proceeds with disconnecting from the current wireless network, and connecting to the preferred wireless network.

Figure 5:
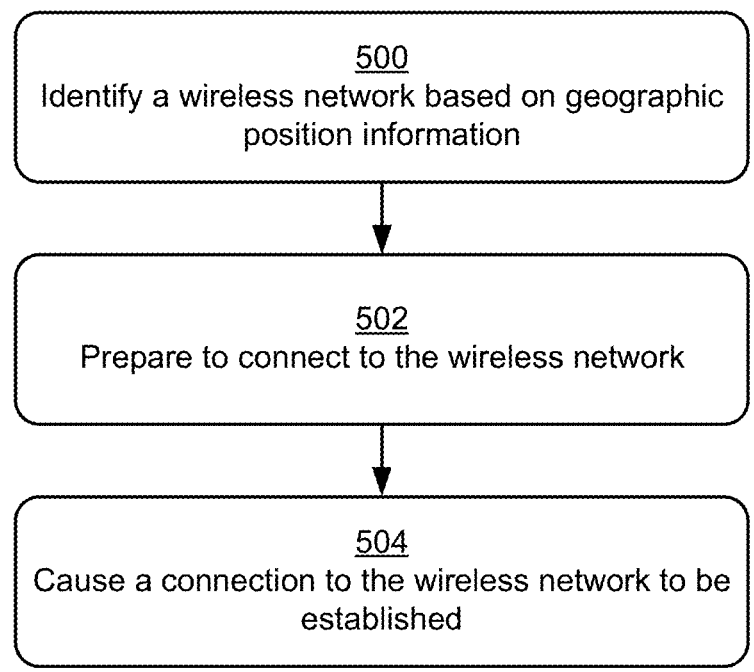
FIG. 5 is a flow diagram that describes steps in a method for preparing for connection to a wireless network in accordance with one or more implementations.

FIG. 5 is a flow diagram that describes steps in a method for preparing for connection to a wireless network in accordance with one or more implementations. The method, for instance, describes an example implementation of step 306 described above with reference to FIG. 3. In at least some implementations, the method is performed by the client device 102, such as by the connectivity module 110.

Step 500 identifies a wireless network based on geographic position information. For instance, the connectivity module 110 searches the network DB 112 with the geographic position information to identify a wireless network that is capable of providing wireless connectivity in a geographic region identified by the geographic position information. Alternatively or additionally, the connectivity module 110 queries the network information service 122 with the geographic position information and requests information for one or more wireless networks capable of providing wireless connectivity in a geographic region identified by the geographic position information.

In at least some implementations, the wireless network is identified as a wireless network that is currently in-range of the client device 102. For instance, the geographic position information corresponds to a current location of the client device 102. In another implementation, the wireless network is identified as a wireless network that will be in-range of the client device 102 at a future time. As an example, consider that the client device 102 is in motion, such as with a user that is traveling. Accordingly, the geographic information may include speed and trajectory information for the client device 102 which can be used to identify one or more wireless networks that are predicted to be in range at a future time. The future time may be measured in various units, such as seconds, minutes, and so forth.

Step 502 prepares to connect to the wireless network. The connectivity module 110, for instance, loads connectivity information for the wireless network from a network profile for the wireless network located in the network DB 112. Alternatively or additionally, the connectivity module 110 retrieves connectivity information from the network information service 122. Generally, the connectivity information includes information to enable a wireless connection with the wireless network to be established. Examples of connectivity information are detailed above, and generally include a network ID, authentication information, and so forth.

According to various implementations, the connectivity module 110 provides the connectivity information to a functionality responsible for negotiating a connection to the wireless network, such as the wireless module 106, the operating system 104, and so forth.

Step 504 causes a connection to the wireless network to be established. For example, the connectivity module 110 signals the wireless module 106 that the client device 102 is in-range of the wireless network, and thus the wireless module 106 is to scan for the wireless network. Further, the connectivity module 110 notifies the wireless module 106 to utilize the connectivity information to connect to the wireless network.

Alternatively or additionally, the connectivity module 110 may notify the wireless module 106 that the client device will be in-range of the wireless network at a future time, such as in seconds, minutes, at a particular clock time, and so forth. Thus, the wireless module 106 may schedule a scan for the wireless network to be performed at the future time and utilizing the connectivity information.

Thus, implementations discussed herein enable preparations for connectivity to a wireless network to occur in advance, such as before the wireless network is detected and/or before the wireless network is in-range. Accordingly, when the wireless network is detected, the client device 102 is already prepared to connect to the network, thus reducing connection time and resource usage during the connection process.

Figure 6:
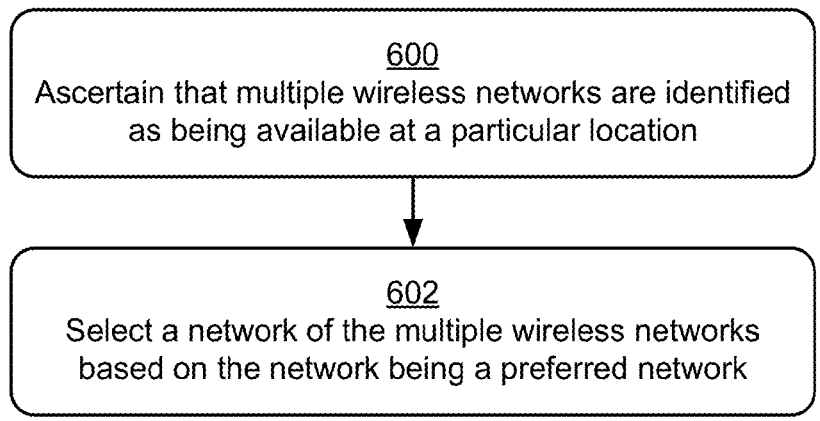
FIG. 6 is a flow diagram that describes steps in a method for selecting a wireless network in accordance with one or more implementations.

FIG. 6 is a flow diagram that describes steps in a method for selecting a wireless network in accordance with one or more implementations. The method, for instance, describes an example extension of the methods described above with reference to FIGS. 3-5. For example, the method describes an implementation of step 406 of FIG. 4 and/or step 500 of FIG. 5. In at least some implementations, the method is performed by the client device 102, such as by the connectivity module 110.

Step 600 ascertains that multiple wireless networks are identified as being available at a particular location. The connectivity module 110, for instance, searches the network DB 112 and/or queries the network information service 122 with geographical position information, and ascertains that multiple wireless networks are available at a location identified by the geographical position information.

Step 602 selects a network of the multiple wireless networks based on the network being a preferred network. Thus, a particular wireless network may be selected from the multiple wireless networks based on network preference, e.g., a preferred wireless network is selected over a non-preferred wireless network. Example factors considered in determining whether a wireless network is preferred are discussed above with reference to the network table 200.

Figure 7:
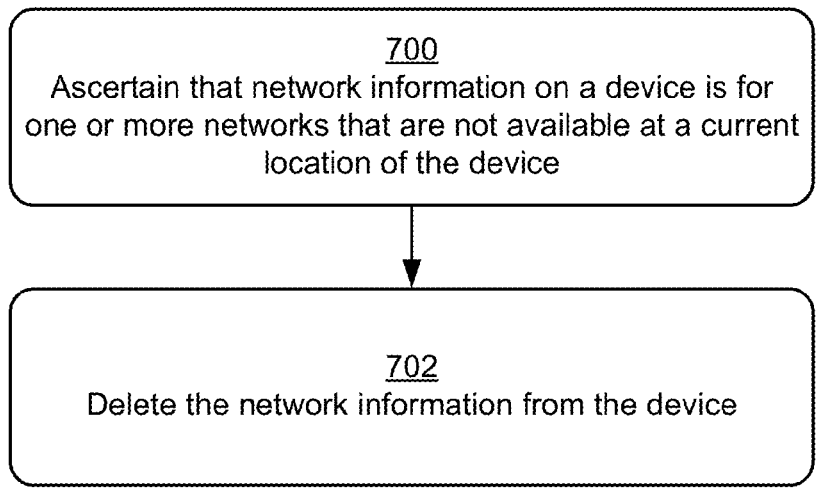
FIG. 7 is a flow diagram that describes steps in a method for deleting stale network information in accordance with one or more implementations.

FIG. 7 is a flow diagram that describes steps in a method for deleting stale network information in accordance with one or more implementations. The method, for instance, describes an example extension of the methods described above with reference to FIGS. 3-6. In at least some implementations, the method is performed by the client device 102, such as by the connectivity module 110.

Step 700 ascertains that network information on a device is for one or more networks that are not available at a current location of the device. For instance, the connectivity module 110 ascertains that network information is stored on the client device 102 for one or more wireless networks that are not available at a current geographic location of the client device 102. The network information, for instance, corresponds to wireless networks that were available at one or more previous (e.g., historic) locations of the client device 102. Thus, the network information may be considered "stale" in that it is not relevant to a current geographic location of the client device 102.

Step 702 deletes the network information from the device. The connectivity module 110, for instance, causes the stale network information to be deleted from the network DB 112. Accordingly, data storage space of the client device 102 is conserved by freeing storage space occupied by stale network information.

Figure 8:
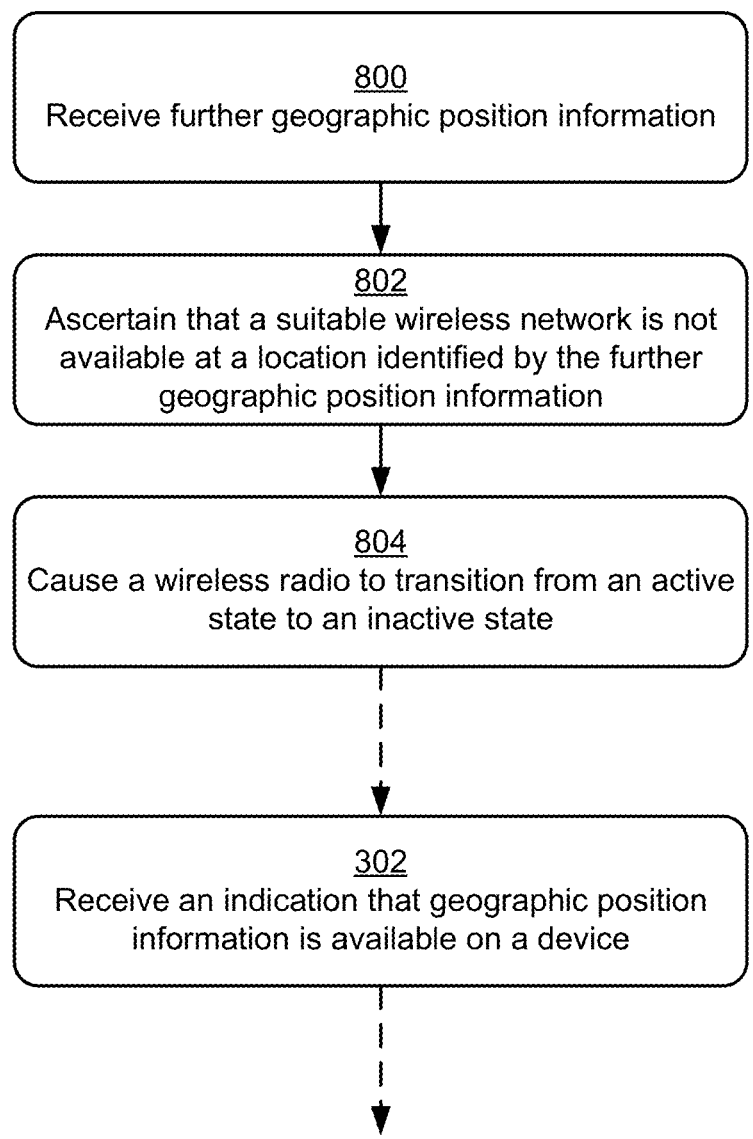
FIG. 8 is a flow diagram that describes steps in a method for causing a wireless radio to transition to an inactive state in accordance with one or more implementations.

FIG. 8 is a flow diagram that describes steps in a method for causing a wireless radio to transition to an inactive state in accordance with one or more implementations. The method, for instance, describes an example extension of the methods described above with reference to FIGS. 3-7. In at least some implementations, the method is performed by the client device 102, such as by the connectivity module 110.

Step 800 receives further geographic position information. The connectivity module 110, for instance, retrieves further geographic position information that is different than previously-received geographic position information. According to various implementations, the geographic position information indicates that the client device 102 has moved from a previous geographic location to a different geographic location.

Step 802 ascertains that a suitable wireless network is not available at a location identified by the further geographic position information. For example, the connectivity module 110 searches the network DB 112 and/or queries the network information service 122 with the further geographic position information, and ascertains that a suitable wireless network is not available. In at least some implementations, this indicates that a wireless network is not available at the location.

Alternatively, this indicates that a wireless network is available, but that the wireless network does not meet one or more connectivity criteria for identifying the wireless network as being suitable for connectivity. Examples of such connectivity criteria include minimum network security procedures, minimum signal strength and/or signal quality, a maximum connectivity cost (e.g., a price for network connectivity), and so forth. Thus, a wireless network may be available, but may be determined to be unsuitable due to failure of the wireless network to meet one or more connectivity criteria.

Step 804 causes a wireless radio to transition from an active state to an inactive state. The connectivity module 110, for instance, causes one or more of the wireless radios 116 to transition to an inactive state responsive to ascertaining that a suitable wireless network is not available. Thus, battery power is conserved by inactivating a wireless radio when suitable wireless networks are not available. Otherwise, a wireless radio may continually scan for wireless networks, which reduces battery life of a device.

According to various implementations, the procedure may return to step 302 of FIG. 3 responsive to receiving yet additional geographic position information. Should a suitable wireless network be identified based on the additional geographic position information, actions may be performed to establish connectivity to the suitable wireless network, such as activating a wireless radio as well as other actions detailed above.

Thus, techniques discussed herein provide multiple performance optimizations for wireless enabled devices. For instance, a functionality configured to manage wireless connectivity (e.g., the connectivity module 110) is maintained in an inactive state until geographic position information is available, thus conserving power and processing resources that would be used to maintain the functionality in an active state. As another example, a scan for an available wireless network is scheduled based on knowledge of available wireless networks at a particular geographic location, thus preventing open scanning in locations where suitable wireless networks are not present. As yet another example, a device's wireless radio may be kept in an inactive state until the device is at a geographic location known to have one or more suitable wireless networks.

Having discussed some example procedures, consider now a discussion of an example system and device in accordance with one or more embodiments.

Example System and Device

Figure 9:
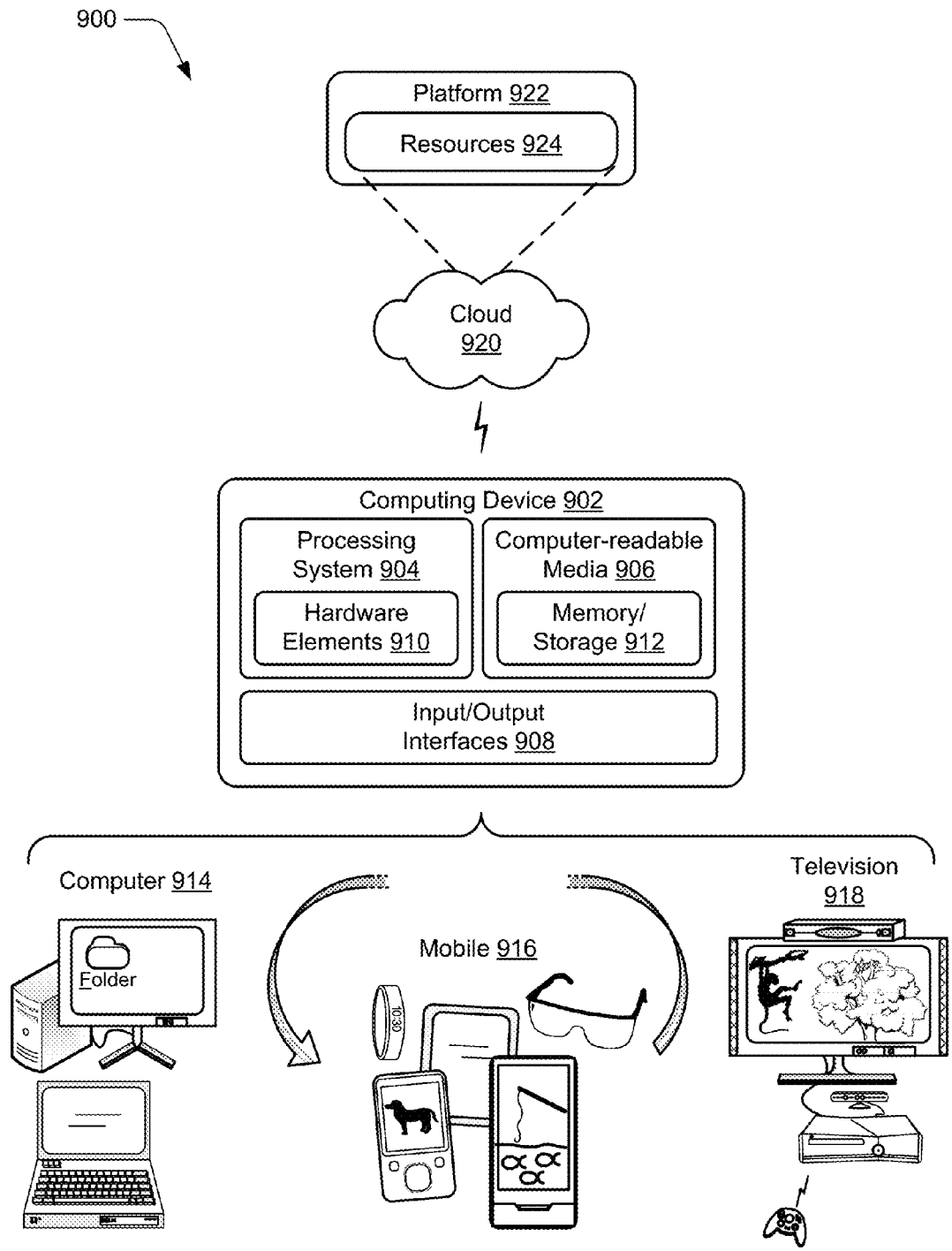
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more I/O Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 190 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similarly in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, a wearable device, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the client device 102 and/or the network information service 122 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 912. Resources 924 can also include services provided over the Internet and/or through a subscriber network, such as a cellular or Wi-Fi™ network.

The platform 922 may abstract resources and functions to connect the computing device 912 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 912 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system comprising: one or more processors; and one or more computer-readable storage media storing computer-executable instructions that are executable by the one or more processors to perform operations including: receiving an indication that geographic position information is available on a device; retrieving the geographic position information from a location that is local to the device; and performing one or more actions in response to retrieving the geographic position information including: selecting a wireless network that is available at a location identified by the geographic position information; and scheduling a network scan to detect the wireless network.

Example 2

A system as described in example 1, wherein the indication that geographic position information is available comprises a wake event for a functionality that performs the operations.

Example 3

A system as described in one or more of examples 1 or 2, wherein the indication that geographic position information is available is independent of a query for the geographic position information.

Example 4

A system as described in one or more of examples 1-3, wherein the geographic position information is retrieved by a first functionality, and where the indication that geographic position information is available is received by a second functionality and independent of a query by the second functionality for the geographic position information.

Example 5

A system as described in one or more of examples 1-4, wherein the system comprises a mobile device, and wherein the indication that geographic position information is available is received by a functionality of the mobile device from an operating system of the mobile device, and independent of a query by the functionality for the geographic position information.

Example 6

A system as described in one or more of examples 1-5, wherein said selecting comprises using the geographic position information to query a remote service, and receiving identification information for the wireless network from the remote service.

Example 7

A system as described in one or more of examples 1-6, wherein said selecting comprises using the geographic position information to locate the wireless network in a database that correlates wireless networks to respective geographic locations, and wherein the operations further include deleting from the database information for one or more wireless networks that are not identified as being available at the location identified by the geographic position information.

Example 8

A system as described in one or more of examples 1-7, wherein said selecting comprises identifying multiple wireless networks that are available at the location, and wherein the wireless network is selected based on the wireless network being a preferred network.

Example 9

A system as described in one or more of examples 1-8, wherein said scheduling the network scan comprises scheduling the network scan to occur at a future time.

Example 10

A system as described in one or more of examples 1-9, wherein said scheduling the network scan comprises causing a wireless radio of the device to transition from an inactive state to an active state, and to scan for the selected wireless network.

Example 11

A system as described in one or more of examples 1-10, wherein said scheduling the network scan occurs while the network is not currently detected by the device.

Example 12

A system as described in one or more of examples 1-11, wherein the operations further include retrieving authentication information for the wireless network to be used to connect to the wireless network.

Example 13

A system as described in one or more of examples 1-12, wherein the operations further include causing connectivity information for the wireless network to be loaded prior to the wireless network being detected.

Example 14

A system as described in one or more of examples 1-13, wherein the operations further include, prior to said receiving an indication that geographic position information is available on a device, registering to receive the geographical position information from a functionality of the device.

Example 15

A computer-implemented method comprising: receiving a wake event indicating that geographic position information is available on a device; retrieving the geographic position information in response to the wake event; performing one or more actions in response to retrieving the geographic position information, including: selecting a wireless network that is available at a location identified by the geographic position information; and causing a wireless radio of the device to transition from an inactive state to an active state to scan for the wireless network.

Example 16

A computer-implemented method as described in example 15, wherein the wake event is received by a functionality while the functionality is in an inactive state, and wherein the method further comprises, prior to receiving the wake event, registering the functionality to receive the wake event in response to the geographic position information being available locally on the device.

Example 17

A computer-implemented method as described in one or more of examples 15 or 16, wherein said causing comprises scheduling a network scan to be performed to scan for the wireless network via the wireless radio.

Example 18

A computer-implemented method as described in one or more of examples 15-17, further comprising: receiving further geographic position information; ascertaining that a suitable wireless network is not available at a location identified by the further geographic position information; and causing the wireless radio to transition from the active state to the inactive state responsive to said ascertaining.

Example 19

One or more computer-readable storage media storing instructions that are executable by a computing device to perform operations comprising: retrieving geographic position information that is available locally on a device and independent of a query for the geographic position information; and performing an action in response to retrieving the geographic position information, including at least one of: selecting a wireless network that is available at a location identified by the geographic position information; scheduling a network scan to detect the wireless network; or causing a wireless radio to transition from an inactive state to an active state to scan for the wireless network.

Example 20

One or more computer-readable storage media as described in example 19, wherein the operations further comprise causing the wireless radio to remain in the inactive state until the device is determined to be at the location identified by the geographic position information.

CONCLUSION

Techniques for geographic information for wireless networks are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more processors; and
one or more computer-readable storage media storing computer-executable instructions that are executable by the one or more processors to perform operations including:
maintaining a connectivity module in an inactive state;
receiving an indication at the connectivity module that geographic position information is available at a local location within the system and independent of querying for the geographic position information by the connectivity module, the indication being different than the geographic position information; and
based on receiving the indication, activating the connectivity module and initiating operations by the connectivity module including:
retrieving the geographic position information from the local location within the system and independent of querying for the geographic position information by the connectivity module; and
performing one or more actions in response to retrieving the geographic position information including:
selecting a wireless network corresponding to a location identified by the geographic position information, said selecting being independent of detecting a wireless transmission from the wireless network; and
scheduling a network scan to detect the wireless network based on the retrieved geographic position information.

2. The system as described in claim 1, wherein the geographic position information is retrieved by a first functionality different than the connectivity module.

3. The system as described in claim 1, wherein the system comprises a mobile device, and wherein the indication that geographic position information is available is received from an operating system of the mobile device.

4. The system as described in claim 1, wherein said selecting comprises using the geographic position information to query a remote service, and receiving identification information for the wireless network from the remote service.

5. The system as described in claim 1, wherein said selecting comprises using the geographic position information to locate the wireless network in a database that correlates wireless networks to respective geographic locations, and wherein the operations further include deleting from the database information for one or more wireless networks that are not identified as being available at the location identified by the geographic position information.

6. The system as described in claim 1, wherein said selecting comprises identifying multiple wireless networks that are available at the location, and wherein the wireless network is selected based on the wireless network being a preferred network.

7. The system as described in claim 1, wherein said scheduling the network scan comprises scheduling the network scan to occur at a future time.

8. The system as described in claim 1, wherein said scheduling the network scan comprises causing a wireless radio of the device to transition from an inactive state to an active state, and to scan for the wireless network.

9. The system as described in claim 1, wherein said scheduling the network scan occurs while the wireless network is not currently detected by the device.

10. The system as described in claim 1, wherein the operations further include retrieving authentication information the wireless network to be used to connect to the wireless network.

11. The system as described in claim 1, wherein the operations further include causing connectivity information for the wireless network to be loaded prior to the wireless network being detected.

12. The system as described in claim 1, wherein the operations further include, prior to said receiving an indication that geographic position information is available on a device, registering to receive the geographical position information from a functionality of the device.

13. A computer-implemented method comprising:
maintaining a connectivity module of a computing device in an inactive state;
receiving an indication at the connectivity module that geographic position information is available at a local location within the computing device and independent of querying for the geographic position information by the connectivity module, the indication being different than the geographic position information;
based on receiving the indication, activating the connectivity module and performing one or more actions by the connectivity module including:
retrieving the geographic position information from the local location within the computing device and independent of querying for the geographic position information by the connectivity module; and
performing one or more actions in response to retrieving the geographic position information, including:
selecting a wireless network corresponding to a location identified by the geographic position information, said selecting being independent of detecting a wireless transmission from the wireless network; and
causing a wireless radio of the computing device to transition from an inactive state to an active state to scan for the wireless network based on the retrieved geographic position information.

14. The computer-implemented method as described in claim 13, wherein the method further comprises, prior to receiving the indication, registering the connectivity module to receive the indication.

15. The computer-implemented method as described in claim 13, wherein said causing comprises scheduling a network scan to be performed to scan for the wireless network via the wireless radio.

16. The computer-implemented method as described in claim 13, further comprising:
receiving further geographic position information;
ascertaining that a suitable wireless network is not available at a location identified by the further geographic position information; and
causing the wireless radio to transition from the active state to the inactive state based on said ascertaining.

17. A computer-implemented method comprising:
registering a connectivity module of a computing device to receive an indication that geographic position information is available at a local location within the computing device, the indication being different than the geographic position information;
maintaining the connectivity module in an inactive state;
receiving, independent of querying for the geographic position information, an indication at the connectivity module that the geographic position information is available at the local location;
based on receiving the indication, activating the connectivity module and performing one or more actions by the connectivity module including:
retrieving the geographic position information from the local location; and
performing an action in response to retrieving the geographic position information, including at least one of:
selecting a wireless network that is available at a location identified by the geographic position information, said selecting being independent of detecting a wireless transmission from the wireless network;
scheduling a network scan to detect the wireless network independent of detecting the wireless transmission from the wireless network; or
causing a wireless radio to transition from an inactive state to an active state to scan for the wireless network independent of detecting the wireless transmission from the wireless network.

18. The computer-implemented method as described in claim 17, wherein the operations further comprise causing the wireless radio to remain in the inactive state until the computing device is determined to be at the location identified by the geographic position information.

19. The computer-implemented method as described in claim 17, wherein the geographic position information is retrieved by a location module different than the connectivity module.

20. The computer-implemented method as described in claim 19, wherein the location module retrieves the geographic position information based on a request from an additional functionality different than the connectivity module and the location module.

* * * * *